United States Patent [19]

Smith

[11] Patent Number: 5,422,414
[45] Date of Patent: Jun. 6, 1995

[54] MODIFIED POLYUREA-POLYURETHANE SYSTEMS ENDOWED WITH IMPROVED PROCESSABILITY

[75] Inventor: Stuart B. Smith, Conyers, Ga.

[73] Assignee: ECP Enichem Polimeri Netherlands B.V., Amsterdam, Netherlands

[21] Appl. No.: 160,783

[22] Filed: Dec. 3, 1993

Related U.S. Application Data

[63] Continuation-in-part of Ser. No. 130,799, Oct. 4, 1993, abandoned.

[51] Int. Cl.⁶ .................... C08G 18/42; C08G 18/79; C08G 18/08; C08K 5/09
[52] U.S. Cl. ......................... 528/60; 524/751; 524/773; 524/774; 524/775; 524/874; 524/875; 528/48; 528/64; 528/66; 528/67; 528/73; 528/76; 528/77; 528/75; 528/80; 528/81; 528/84; 264/328.1; 264/328.6; 264/328.8; 264/331.19
[58] Field of Search ............. 524/751, 773–774, 524/775, 874, 875; 528/60, 64, 66, 48, 67, 73, 80, 81, 84, 75, 76, 77; 264/328.1, 328.6, 328.8, 331.19

[56] References Cited

U.S. PATENT DOCUMENTS

| | | | |
|---|---|---|---|
| 3,914,198 | 10/1975 | Olstowski | 528/48 |
| 4,218,543 | 8/1980 | Weber et al. | 528/67 |
| 4,246,363 | 1/1981 | Turner et al. | 521/163 |
| 4,269,945 | 5/1981 | Vanderhider et al. | 521/159 |
| 4,284,730 | 8/1981 | Narayan et al. | 521/160 |
| 4,396,729 | 8/1983 | Dominquez et al. | 521/51 |
| 4,433,067 | 2/1984 | Rice et al. | 521/51 |
| 4,438,235 | 3/1984 | Brizgys | 528/81 |
| 4,444,910 | 4/1984 | Rice et al. | 521/51 |
| 4,559,366 | 12/1985 | Hostettler | 521/51 |
| 4,595,742 | 6/1986 | Nalepa et al. | 528/64 |
| 4,595,742 | 6/1986 | Nalepa et al. | 528/64 |
| 4,631,298 | 12/1986 | Presswood | 521/163 |
| 4,636,531 | 1/1987 | Schmidt et al. | 528/64 |
| 4,786,656 | 11/1988 | Presswood et al. | 521/159 |
| 4,798,851 | 1/1989 | Werner et al. | 528/60 |
| 5,202,358 | 4/1993 | Scholl et al. | 521/160 |

Primary Examiner—John Kight, III
Assistant Examiner—Rabon Sergent
Attorney, Agent, or Firm—Oblon, Spivak, McClelland, Maier, & Neustadt

[57] ABSTRACT

This invention relates to a polyurea-imide RIM composition, molded articles of a polyurea-imide RIM composition, and a method of forming a polyurea-imide molded article.

15 Claims, No Drawings

MODIFIED POLYUREA-POLYURETHANE SYSTEMS ENDOWED WITH IMPROVED PROCESSABILITY

This application is a Continuation-In-Part Application of U.S. Ser. No 08/130,799 filed on Oct. 4, 1993, now abandoned.

BACKGROUND OF THE INVENTION

1. Field of the Invention

This invention relates to a modified polyurea-polyurethane RIM composition, molded articles of a modified polyurea-polyurethane RIM composition, and a method of forming a modified polyurea-polyurethane molded article.

2. Discussion of the Background

Polyurethane polymers prepared from an active hydrogen-containing compound and an isocyanate are widely employed in molding processes, particularly reaction injection molding (hereinafter RIM) processes. RIM articles are finding increased usage as automotive fascia.

The basic polyurethane polymer systems are typically based on an OH polyol component, an OH cross-linker and an isocyanate component. However this system suffers from long cream, demolding and cycle times, greatly increasing the processing time. Modifications to the basic polyurethane system to shorten these processing times have been achieved through substitution of the OH cross-linker with an aminic cross-linking system. Typically, thermosetting urethane polymer compositions comprise an isocyanate component with an excess of isocyanate groups and an aromatic diamine as a chain extender, to form a polyurea-type urethane polymer. Optionally, the polymer composition may also contain additional amounts of a reactive polyol to form a hybrid urea-urethane polymer. Such systems greatly decrease the cream and demolding times, therefore enabling much shorter cycling times in a RIM process.

The use of chain extenders, such as di-alkyl aromatic diamines, and more particularly di-ethyltoluene diamines and di(alkylthio)aromatic diamines are often used with isocyanate pre-polymers alone or with a polyol component to form a polyurethane/polyurea molding RIM composition (for example U.S. Pat. Nos. 4,595,742, 4,631,298, and 4,786,656). While an increase in the flexural modulus is observed through the addition of di-alkyl(thio)aromatic diamines, these compositions are still limited with respect to flexural modulus without observing "cold break" on demolding. "Cold Break" is a brittleness observed in the molded article during demolding. The presence of cold break causes the molded article to fracture on demolding. When trying to achieve a higher flexural modulus, to above 80,000 psi, by increasing the isocyanate content of the isocyanate component (i.e. higher % NCO), these materials suffer "cold break". Alternatively attempts to increase the flexural modulus by increasing the functionality of the polyol component also suffers from "cold break".

In addition to the mechanical properties of the polyurethane polymer, the processing of the polymer systems plays an important role in the usefulness of a polyurethane system. In RIM processing, a short gel time is desired to increase the productivity of the overall process. However, polyurethane systems based on an OH polyol component, an OH cross-linker and an isocyanate component had a gel time of from 5-8 seconds and a cycle time of from 3-3.5 min. Polyurethane systems using $-NH_2$ crosslinkers and $-OH$ polyols (for example U.S. Pat. Nos. 4,595,742, 4,631,298, and 4,786,656) reduced the gel time to about 1.2 seconds and the cycle time to 1.5-2 min. This greatly increased the productivity of RIM processes using these systems, but these $-NH_2$ crosslinkers and $-OH$ polyols systems suffered from an inability to increase the flexural modulus above 80,000 psi without observing "cold break", without the addition of fillers.

Polyurea systems based on amine terminated polyether resins and aminic cross-linkers have been developed (U.S. Pat. Nos. 4,396,729, 4,433,067 and 4,444,910), which afford superior heat resistance and mechanical properties. Due to the extremely high reactivity of the amine terminated polyether resin, the gel times are extremely short, in the range of 0.7 seconds and the demold times are very short. Such a rapid reaction rate makes these systems very difficult to manipulate, and also severely limits the type of RIM technique for which such a composition is suitable.

One of the major problems encountered is the RIM processes in premature gelling of the composition, causing insufficient filling of the mold, or limiting the size of the molded article due to the rapidity with which the system gels. In processing by RIM methods, it is necessary that the molding composition maintains a sufficiently low viscosity in order to completely fill the mold. After the mold is filled, the material must then polymerize very rapidly in order to reduce the demolding times. The two properties are at opposite ends since to increase the demolding times by using a rapidly polymerizing system, the mold size has been limited. By decreasing the gel time to accommodate larger molded articles, the demolding times are increased, thereby decreasing productivity of the overall operation.

One solution to increase the mold size without decreasing the rate of polymerization, is to increase the output rate of the RIM machine. In this way more material can be injected into the mold over a short period of time, which allows for the formation of larger articles. However, there is increased costs in high output RIM machines. Moreover, even this solution has its limitations and is still limited by the viscosity of the material and the rate that it can be injected by.

Another related problem associated with the longer gel times needed to accommodate larger molds, is the production of molded articles which exhibit a rubbery feel upon demold due to insufficient curing of the composition. Even though the molded article has sufficient structural integrity to be demolded, the molded article requires further curing to obtain the desired stiffness of the final product. This post-demolding curing only further adds to the processing time.

Ideally, a polyurethane system which exhibited a low viscosity during the mold filling stage, yet rapidly polymerized and cured after the mold has been filled is desired. Such a system would exhibit a non-linear increase in viscosity initially, followed by a very rapid increase in viscosity at the end.

The reactivity problem becomes more stringent in the case of Structural Reaction Injection molding (SRIM). This technology is not applicable to such systems having short reaction time, resulting in incomplete wetting of the structural reinforcement.

Consequently, research continues into systems with excellent mechanical and processing properties.

SUMMARY OF THE INVENTION

Accordingly, one object of this invention is to provide a novel modified polyurea-polyurethane system comprising:
- A) a polyisocyanate component comprising:
  - i) a polyisocyanate having a free isocyanate content of from 10-33% by weight;
- B) a polyol component comprising:
  - i) a polyester polyol of functionality 2-3 and a number average molecular weight of 400-6,000, preferably, 500-1,200;
  - ii) an aromatic diamine; and
  - iii) an aminic polyol; and
- C) 2-30% by weight based on the total polyisocyanate component (A) of an anhydride having formula:

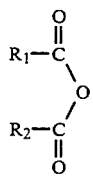

(I)

wherein $R_1$ and $R_2$, equal or different, are $C_1$-$C_{10}$ iso(alkyl) radicals, or $R_1$ and $R_2$ together form a $C_5$-$C_{10}$ saturated or unsaturated (alkyl)cycloaliphatic radical or a $C_6$-$C_{10}$ (alkyl) aromatic radical.

Another object of the invention is to provide a novel modified polyurea-polyurethane molded article comprising the reaction product of:
- A) a polyisocyanate component comprising:
  - i) a polyisocyanate having a free isocyanate content of from 10-33% by weight;
- B) a polyol component comprising:
  - i) a polyester polyol of functionality 2-3, having a number average molecular weight of 400-6,000, preferably, 500-1,200;
  - ii) an aromatic diamine; and
  - iii) an aminic polyol; and
- C) 2-30% by weight based on the total polyisocyanate component (A) of a carboxylic anhydride (I).

Another object of the invention is to provide a method of forming a modified polyurea-polyurethane molded article.

The inventor of the present invention has discovered that the addition of a carboxylic anhydride (I) provides a modified polyurea-polyurethane molding composition with excellent processability, in terms of very long gel times and very short demolding times, to form articles with high impact strength, flexural modulus, and excellent green strength after demolding.

DETAILED DESCRIPTION OF THE PREFERRED EMBODIMENTS

The isocyanate component may be any polyisocyanate used in forming polyurethanes. Specific non-limiting examples of the polyisocyanate component can be an aromatic or aliphatic polyisocyanate, such as methylene bis(4-phenylisocyanate) (hereinafter MDI), crude MDI, uretonimine-MDI, hydrogenated MDI, 2,6-toluene diisocyanate (hereinafter TDI), 1,5 naphthalene diisocyanate (hereinafter NDI), m-xylylene diisocyanate (hereinafter XDI), 1,3-bis(isocyantomethyl)cyclohexane ($H_6$XDI), p-phenylene diisocyanate, polymethylene polyphenylisocyanate, dianisidine diisocyanate, bis(3-methyl-3-isocyanatophenyl)methane, bis(3-methyl-4-isocyanatophenyl)methane, 4,4'-diphenylpropane diisocyanate, hexamethylene diisocyanate (hereinafter HDI) and HDI-biuret obtained by treatment of HDI with water.

In addition, the polyisocyanate component may be an isocyanate quasi pre-polymer which is the reaction product of a polyisocyanate as recited above, but more specifically MDI, crude MDI, TDI, HDI and uretonimine modified-MDI, with a polyether polyol component, having a final free NCO content of 10-27% by weight, more particularly 14-22% by weight. The isocyanate quasi pre-polymer preferably has an NCO equivalent of 420-168 and a viscosity of 1,000-150 centipoise at 75° F.

The polyether polyol component in forming the quasi pre-polymer is a polyether polyol of functionality 2-4 based on a di-, tri-, or tetraol such as ethylene, glycol, glycerine or pentaerythritol. The polyether polyol is extended ethylene oxide (EO), propylene oxide (PO) or both. More preferably, the EO content is 10-85 wt. % and the PO content is 15-90 wt. %, most preferably a triol having 70 wt. % EO and 30 wt. % PO is preferred.

The polyether polyol has a number average molecular weight $M_n$ of 500-6,000, preferably 2,000-5,000, more preferably 4,800. However the polyether polyol component should be a liquid at the processing temperatures for RIM of about 80°-100° F., preferably 90° F.

The polyether polyol can be either a random heteropolymer of polyethylene oxide and polypropylene oxide units or end capped with ethylene oxide.

The polyether polyol has a hydroxyl number of from 28-38, more preferably 35. A suitable material is sold commercially as POLY-G 83-34 (a trademark of Olin Chemicals).

The polyether polyol may be made by conventional methods known to those of ordinary skill in the art. More specifically, polyether polyols can be made by the reaction of ethylene oxide and/or propylene oxide with a di-, tri or tetraol, with the aid of a catalyst such as potassium or sodium hydroxide. A suitable method is described in *Kirk-Othmer Encyclopedia of Chemical Technology* 3rd. Ed., vol 18, p638+.

The isocyanate component used to form a quasi prepolymer is methylene bis(4-phenylisocyanate) (hereinafter MDI) or a uretonimine modified MDI. The free isocyanate content of the polyisocyanate component is 20-30% by weight free NCO, more preferably 27-29% by weight NCO. The polyisocyanate component is preferably a liquid at room temperature such as the uretonimine modified MDI. The uretonimine modified MDI has a viscosity of 40 cps at 20° C. Uretonimine modified MDI is preferred.

Examples of commercial materials of this type are Dow-Upjohn's ISONATE 125M (pure MDI) and ISONATE 143L (uretonimine modified MDI), RUBINATE LF-168 (a uretonimine modified MDI and trademark of ICI), and T-316 (a uretonimine modified MDI manufactured by EniChem).

The isocyanate quasi pre-polymer is prepared by reacting 1 part of the polyether polyol component with from 1-6 part of the polyisocyanate at a temperature of from room temperature (72° F.) to 300° F., more preferably 120°-150° F., for a period of 2-3 hours.

The materials may be reacted at room temperature, but preferably they are heated to a temperature of 150° F.

The polyol component B) used in the modified polyurea-polyurethane system of the present invention comprises:

i) a polyester polyol of functionality 2-3 having a number average molecular weight of 400-6,000, preferably, 500-1,200;
ii) an aromatic diamine; and
iii) an aminic polyol.

As polyester polyols are saturated fatty acid diesters of polyalkylene diols. For example, $C_{2-8}$ fatty diacid esters of polyethyleneglycol, polypropyleneglycol or ethylene oxide/propylene oxide copolymer, for example a polyethyleneglycol adipate.

The polyester polyol component has a number average molecular weight of from 400-6,000, preferably from 500-1,200. However it is preferred that the polyester polyol remains a liquid at RIM temperatures of 80°-100° F., preferably 90° F.

The polyester polyol component can be made by conventional methods known to those of ordinary skill in the art. For example a polyester polyol can be prepared by esterification of a polyalkyleneglycol with a fatty diacid.

As the aromatic diamine component, are diethyltoluene diamine or DETDA which is commercially available as a product of the Ethyl Corporation (ETHACURE 100) and comprises a mixture of positional isomers having about 76% 1-methyl-3,5-diethyl-2,4-diaminobenzene and about 24% 1-methyl-3,5-diethyl-2,6-diaminobenzene. Also suitable as the aromatic diamine component is dimethylthiotoluenediamines such as 1-methyl,-3,5-dimethylthio-2,4-diaminobenzene and 1-methyl-3,5-dimethylthio-2,6-diaminobenzene available from the Ethyl Corporation as (ETHACURE®300).

The aromatic diamine component may be made by conventional means known to those of ordinary skill in the art. The synthesis of 1-methyl,-3,5-dimethylthio-2,4-diaminobenzene is described in U.S. Pat. No. 4,595,742.

As the aminic polyol component, are triethanolamine or $C_2$-$C_3$ alkyleneoxide adducts of triethanolamine, diethanolamine, etc. A triethanolamine end capped ethylene oxide or propylene oxide adduct of molecular weight ranging from 600-1,000 or more is preferred. Also suitable are aromatic diamines, such as toluenediamine, which are both ethoxylated or proproxylated. Also suitable are ethylene diamine polyols. The aminic polyol component may also be used as a mixture of the above-identified materials. An aminic polyol with 10-20% by weight of ethylene oxide units and 80-90% by weight of propylene oxide units is preferred. Especially suitable is a mixture of toluenediamine of OH #340 and ethylene diamine propoxylated polyol.

The aminic polyol component may be made by conventional means known to those of ordinary skill in the art in a manner analogous to the synthesis of hydroxy based polyether polyols.

The polyester polyol, aromatic diamine, aminic polyol components form the polyol component B) of the modified polyurea-polyurethane system. The system preferably contains from 25-50 pbw of the polyester polyol, more preferably 30-40 pbw; 25 pbw of the aromatic diamine component; 10-25 pbw of the aminic polyol component.

The modified polyurea-polyurethane composition is formed in the absence of a urethane forming catalyst.

The catalyst absence is a great advantage since the presence of catalytic amounts of urethane forming catalysts results in a reduction of the aging stability of the B component.

The polyol component B) is mixed with the polyisocyanate component A) at a 102 index or greater. A 102 index is known to those of ordinary skill in the art as meaning that at least 1.02 equivalents of isocyanate groups in the polyisocyanate component A) are reacted per equivalent of active hydrogen containing component based on the polyol component B). Preferably the index is in the range of 102-110, more preferably 105.

The carboxylic anhydride component C) is any carboxylic anhydride which is non-reactive with the polyisocyanate and is miscible or soluble in the polyisocyanate. It is also preferred that the carboxylic anhydride be non-toxic. Specifically 4-methyl- 1,2,3,6-tetrahydrophthalic anhydride is preferred. Other liquid carboxylic anhydrides, such as anhydrides of $C_{2-6}$ aliphatic carboxylic acids like acetic, propionic and butyric anhydride are also suitable.

Aliphatic carboxylic anhydrides may be prepared by conventional means known to those of ordinary skill in the art. In particular, 4-methyl- 1,2,3,6-tetrahydrophthalic anhydride can be prepared by conventional methods known to those of ordinary skill in the art, for example by the cycloaddition reaction of maleic anhydride with isoprene.

The carboxylic anhydride component is added in an amount of 2-30% by weight, preferably 3-25% by weight more preferably 5-20% by weight, even more preferably 8-12% by weight based on the total weight of the polyisocyanate component A). The carboxylic anhydride may be added as a separate component stream during the RIM process or may also be added directly to the isocyanate component A), before reaction with polyol component B).

It has been surprisingly discovered that when dimethylthiotoluenediamines are used along with an aminic polyol and polyol polyester as the polyol component B) and an uretonimine modified MDI as the polyisocyanate component A) and 4-methyl 1,2,3,6-tetrahydrophthalic anhydride as the carboxylic anhydride component C), the resulting modified polyurea-polyurethane article is translucent to light. Without the anhydride, a cloudy white composition resulted. However translucency in a polyurethane type system is a very rare phenomenon. While the resulting material has a light yellow cast, the cured material is optically clear to the extent that when a ½" thick piece of the molded modified polyurea-polyurethane composition is placed over type written material, the type can be clearly read without distortion.

It has also been discovered that, when an aromatic isocyanate is used as the polyisocyanate component A), resulting composition exhibits surprisingly improved stability to U.V. light. Typically, polyurethane compositions based on aromatic isocyanates are not light stable and undergo a discoloration upon prolonged exposure. Unexpectedly, in the presence of the carboxylic anhydride, such discoloration is not observed.

The process of forming modified polyurea-polyurethane compositions according to the present invention is accomplished by conventional reaction injection molding techniques (RIM), or reinforced reaction injection molding (RRIM) or structural reaction injection molding (SRIM) techniques. The process also allows for spray molding. This includes both open and closed mold processes. This allows for a substitute spray molding composition which gives physical properties as good or better than conventional polyester resin fiberglass article, yet avoids the problem of volatile organic compounds. In addition, the composition can be applied using existing spray molding equipment.

In spray molding it is preferable that the molded article be subjected to a post mold curing at a temperature of above 200° F. for 1 h, preferable at 250° F. for 1 h. Alternatively, or in addition to it is possible to heat the mold to a temperature of 200-250° F. to insure a complete curing.

The present invention also allows for the formation of a Structural Reaction Injection Molding (SRIM) molded article with an A class surface. This is achieved by RIM molding or spraying a surface layer of the modified polyurea-polyurethane composition of the present invention on either or both surfaces of a mold to form the exterior surfaces, followed by forming an intermediate layer by conventional SRIM methods. The modified polyurea-polyurethane surface layer may be filled or unfilled with conventional fillers and additives. Conventional SRIM articles often suffer the drawback of a surface layer which reveals the fiberglass structural reinforcement. By forming a surface layer of modified polyurea-polyurethane, an A class surface can now be obtained in an SRIM article. The surface layer of modified polyurea-polyurethane may be from 0.1-0.2" thick, preferably 0.125". It is preferable for the intermediate layer be of the same polymer composition as the surface layers to avoid delamination problems due to differences in the coefficient of thermal expansion.

The present process also allows for molded articles to contain suitable fillers and reinforcing material and the like, stabilizer, mold release agents and other additives known to those of ordinary skill in the art as commonly employed in the field of polyurethane molding compositions, especially RIM, RRIM and SRIM molding compositions.

As reinforcing materials are included but not limited to chopped or milled glass fibers, chopped or milled carbon fibers, or mineral fibers such as calcium silicate or wollastonite fibers or mica. Particularly suitable are fiberglass reinforcement fibers, particularly those having lengths of from about 1/16" to about ½".

The molded articles from this modified polyurea-polyurethane system according to the present invention has high flexural modulus in the range of 150–400,000 psi and a Gardner impact resistance of 80 or greater.

The modified polyurea-polyurethane system can also be foamed in the mold by the addition of air or nitrogen as frothing agents in a manner conventional to RIM methods.

The modified polyurea-polyurethane reactive system of the present invention does not require conventional urethane forming catalysts such as amines or organometallic derivatives, and displays improved processability having relatively long gel times and relatively short demolding times. More specifically, this system has a slow increase of viscosity up to the "gel time" followed by a very fast polymerization rate after the "gel time". This combination gives a total demolding time comparable to those of the prior art. In addition, the slow viscosity build up allows for improved wettability of reinforcing agents in SRIM methods, improved aesthetic surfaces of molded article in RIM, RRIM and SRIM, homogeneous distribution of the reactive material inside the mold and long shelf life of the polyol component B) due to the lack of a conventional catalyst. In addition, Applicant has discovered a translucent modified polyurea-polyurethane composition.

The modified polyurea-polyurethane molding composition of the present invention is useful for forming any molded article conventionally formed by RIM methods.

The modified polyurea-polyurethane molding composition which is translucent to light is especially useful for forming molded containers, especially totes used in the automotive industry.

Other features of the invention will become more apparent the course of the following description of exemplary embodiments which are given for illustration of the invention and are not intended to be limiting thereof.

SYNTHESIS OF ISOCYANATE QUASI PRE-POLYMER

Example 1

A uretonimine modified MDI (T-316 from EniChem, a 29% by weight of free NCO) was reacted with a 4,800 molecular weight polyether triol (glycerine starter) containing, with random distribution, 70% by weight EO, 30% by weight PO (polyol TERCAPUR 1264 from EniChem) at 150° F. The material was dispensed into containers and checked for percent NCO, viscosity and reactivity.

Isocyanate quasi pre-polymers were made by this process with the following NCO percent:

| % NCO | T-316/T-1264 |
|-------|--------------|
| 14    | 1/1          |
| 17    | 1.5/1        |
| 19    | 2/1          |
| 21    | 3/1          |
| 23    | 4/1          |
| 24    | 5/1          |
| 25    | 6/1          |

Comparative Example 2

In this, and all further examples, parts by weight (pbw) are determined based on 25 pbw of the aromatic diamine component.

TABLE 2

| Polyol Component B Composition (pbw) | |
|---|---|
| dimethylthio toluene dismine[1] | 25 |
| TEOA adduct[2] | 25 |
| Polyester polyol[3] | 35 |
| Dibutyl tin dilaurate[4] | 0.1 |
| Polyisocyanate Component A | |
| MDI pre-polymer (21% NCO)[5] | 130 |

[1]ETHACURE 300 from the Ethyl Corporation
[2]a triethanolamine adduct with an OH #650
[3]polyester polyol 11-225 from Witco
[4]UL 28 from Witco
[5]T-9032 from EniChem The A and B components were reacted under the following conditions:
Mold: 600×300 mm plate 3.1 mm thickness (weight 650–750 g)
Mold Temperature: 70° C.
Equipment: Gusmer high pressure machine model Delta Rim 120
Output: 900 g/sec
Raw Material Temperature: 35° C.

The gel time for this system, in the absence of the anhydride was only 10 seconds and the demolding time was 60 seconds. However, the molded article had a rubbery feel after demold even though the impact strength was good after cooling. The molded article had poor heat sag properties and a milky white color.

Comparative Example 3

TABLE 3

| Polyol Component B Composition (pbw) | |
| --- | --- |
| dimethylthio toluene dismine[1] | 25 |
| TEOA adduct[2] | 25 |
| Polyester polyol[3] | 35 |
| Dibutyl tin dilaurate[4] | 0.01 |
| Polyisocyanate Component A | |
| MDI pre-polymer (21% NCO)[5] | 130 |

[1]ETHACURE 300 from the Ethyl Corporation
[2]a triethanolamine adduct with an OH #650
[3]polyester polyol 11-225 from Witco
[4]UL 28 from Witco
[5]T-9032 from EniChem The A and B components were reacted under the same conditions as in Example 2. The gel time for this system increased to 20 seconds and however the demolding time also increased, up to 90 seconds. The molded article had a less rubbery feel after demold than in Example 2, but the composition was more brittle after cooling. The molded article had a milky white color.

Example 4

TABLE 4

| Polyol Component B Composition (pbw) | |
| --- | --- |
| dimethylthio toluene dismine[1] | 25 |
| TEOA adduct[2] | 25 |
| Polyester polyol[3] | 35 |
| Polyisocyanate Composition | |
| MDI pre-polymer (21% NCO)[5] | 130 |
| methyl tetrahydrophthalic anhydride[6] | 10 |

[1]ETHACURE 300 from the Ethyl Corporation
[2]a triethanolamine adduct with an OH #650
[3]polyester polyol 11-225 from Witco
[5]T-9032 from EniChem
[6]Lindride- 2 4-methyl 1,2,3,6-tetrahydrophthalic anhydride from Landau Chemical The polyisocyanate composition, now containing the above specified anhydride and B component, without the organometallic catalyst were reacted under the same conditions as in Example 2. The gel time for this system increased to only 27 seconds but the demolding time was only 45 seconds. In addition, the molded article was rigid upon demold and displayed good impact and heat resistance. The molded article had a clear color.

Example 5

TABLE 5

| Polyol Component B Composition (pbw) | |
| --- | --- |
| dimethylthio toluene dismine[1] | 25 |
| TEOA adduct[2] | 25 |
| Polyester polyol[3] | 35 |
| Polyisocyanate Composition | |
| HDI pre-polymer (21.6% NCO)[8] | 130 |
| methyl tetrahydrophthalic anhydride[6] | 10 |

[1]ETHACURE 300 from the Ethyl Corporation
[2]a triethanolamine adduct with an OH #650
[3]polyester polyol 11-225 from Witco
[6]Lindride 2 4-methyl 1,2,3,6-tetrahydrophthalic anhydride from Landau Chemical
[8]N-3300, an aliphatic pre-polymer made from HDI with a free NCO content of 21.6% from Miles Chemical The polyisocyanate composition, now containing the above specified anhydride and an aliphatic isocyanate, and B component, without the organometallic catalyst, were reacted under the same conditions as in Example 2. The gel time for this system was only 10 seconds and the demolding time was only 20 seconds. In addition, the molded article was rigid upon demolding and displayed good impact and heat resistance above 150° C.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A modified polyurea-polyurethane molding composition comprising:
    A) a polyisocyanate component comprising:
        i) a polyisocyanate having a free isocyanate content of from 10–33% by weight;
    B) a polyol component comprising:
        i) a polyester polyol of functionality 2–3 and a number average molecular weight of 400–6,000;
        ii) an aromatic diamine; and
        iii) an aminic polyol; and
    C) 2–30% by weight, based on the weight of said polyisocyanate (A), of an anhydride, having formula:

(I)

wherein $R_1$ and $R_2$, equal or different, are $C_1$–$C_{10}$ iso(alkyl) radicals, or $R_1$ and $R_2$ together form a $C_5$–$C_{10}$ saturated or unsaturated (alkyl)cycloaliphatic radical or a $C_6$–$C_{10}$ (alkyl)aromatic radical;

wherein said anhydride is not reactive with said polyisocyanate; and said polyol component B) and said polyisocyanate component A) are reacted at a 102 index or greater.

2. The molding composition of claim 1 wherein said anhydride (I) is 4-methyl-1,2,3,6 tetrahydrophthalic anhydride.

3. The molding composition of claim 1 wherein said isocyanate component (A) is a quasi pre-polymer from the reaction of uretonimine modified MDI with a polyether polyol of functionality 2–4 having a number average molecular weight of 500 to 6,000 having a free NCO content of 10–27% b.w..

4. The molding composition of claim 1 wherein said isocyanate component is a quasi pre-polymer which is the reaction product of hexamethylene diisocyanate and a polyether polyol of functionality 2–4 having a number average molecular weight of 500 to 6,000 having a free NCO content of 10–27% b.w..

5. The molding composition of claim 1 wherein polyol component (B) comprises:
    i) 25–50 pbw of a polyester polyol of functionality 2–3 and a number average molecular weight of 400–6,000;
    ii) 25 pbw of an aromatic diamine; and
    iii) 10–25 pbw of an aminic polyol.

6. The molding composition of claim 1 wherein said polyester polyol has a number average molecular weight of from 500–1,200.

7. The molding composition of claim 1 wherein said polyester polyol is polyethyleneglycol adipate.

8. The molding composition of claim 1 wherein a molded article formed from said composition is translucent to light.

9. A modified polyurea-polyurethane molded article comprising the reaction product of:
A) a polyisocyanate component comprising:
   i) a polyisocyanate having a free isocyanate content of from 10–33% by weight;
B) a polyol component comprising:
   i) a polyester polyol of functionality 2–3 and a number average molecular weight of 400–6,000;
   ii) an aromatic diamine; and
   iii) an aminic polyol; and
C) 2–30% by weight, based on the weight of said polyisocyanate (A), of an anhydride having formula:

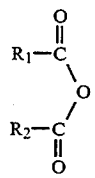

(I)

wherein $R_1$ and $R_2$, equal or different, are $C_1$–$C_{10}$ iso(alkyl) radicals, or $R_1$ and $R_2$ together form a $C_5$–$C_{10}$ saturated or unsaturated (alkyl)cycloaliphatic radical or a $C_6$–$C_{10}$ (alkyl) aromatic radical;
wherein said anhydride is not reactive with said polyisocyanate; and
said polyol component B) and said polyisocyanate component A) are reacted at a 102 index or greater.

10. The molded article of claim 9 wherein said article is translucent to light.

11. A process of forming a modified polyurea-polyurethane molded article comprising the reaction of a molding composition comprising:
A) a polyisocyanate component comprising:
   i) a polyisocyanate having a free isocyanate content of from 10–33% by weight;
B) a polyol component comprising:
   i) a polyester polyol of functionality 2–3 and a number average molecular weight of 400–6,000;
   ii) an aromatic diamine; and
   iii) an aminic polyol; and
C) 2–30% by weight, based on the weight of said polyisocyanate, of an anhydride having the formula:

(I)

wherein $R_1$ and $R_2$, equal or different, are $C_1$–$C_{10}$ iso(alkyl) radicals, or $R_1$ and $R_2$ together form a $C_5$–$C_{10}$ saturated or unsaturated (alkyl)cycloaliphatic radical or a $C_6$–$C_{10}$ (alkyl) aromatic radical;
wherein said anhydride is not reactive with said polyisocyanate; and
said polyol component B) and said polyisocyanate component A) are reacted at a 102 index or greater.

12. The process of claim 11, wherein said reaction is reaction injection molding.

13. The process of claim 11, wherein said reaction is structural reaction injection molding.

14. The process of claim 11, wherein said reaction is reinforced reaction injection molding.

15. The process of claim 11, wherein said reaction is spray molding.

* * * * *